United States Patent
Lin (10) Patent No.: US 8,203,652 B2
(45) Date of Patent: Jun. 19, 2012

(54) SECAM-L DETECTOR AND VIDEO BROADCAST SYSTEM HAVING THE SAME

(75) Inventor: Hung-Shih Lin, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 1310 days.

(21) Appl. No.: 11/898,842

(22) Filed: Sep. 17, 2007

(65) Prior Publication Data

US 2009/0073317 A1 Mar. 19, 2009

(51) Int. Cl.
*H04N 5/06* (2006.01)

(52) U.S. Cl. .......................... 348/529; 348/538; 725/68

(58) Field of Classification Search .......... 348/553–558, 348/643, 644, 529; 725/68, 131, 139, 151
See application file for complete search history.

(56) References Cited

U.S. PATENT DOCUMENTS

| | | | | |
|---|---|---|---|---|
| 5,726,714 A | * | 3/1998 | Maldonado | 348/558 |
| 5,754,251 A | * | 5/1998 | Hulvey | 348/529 |
| 5,995,158 A | * | 11/1999 | Kim | 348/529 |
| 6,055,022 A | * | 4/2000 | Hush | 348/529 |
| 6,377,310 B1 | * | 4/2002 | Okamoto et al. | 348/557 |
| 7,274,406 B2 | * | 9/2007 | Renner et al. | 348/547 |
| 7,801,304 B1 | * | 9/2010 | Harvey et al. | 380/211 |
| 2006/0077302 A1 | * | 4/2006 | Nieuwenhuizen | 348/665 |

* cited by examiner

*Primary Examiner* — Annan Shang
(74) *Attorney, Agent, or Firm* — Rabin & Berdo, P.C.

(57) ABSTRACT

A method for detecting SECAM-L signals is disclosed. First, a SECAM-L signal is received and demodulated into a demodulation signal. Then high frequency components of the demodulation signal are filtered out and a low frequency signal, including many sync pulses and many data pulses, is obtained. Next, the low frequency signal is inversion into an inversion signal, having many inversion sync pulses and many inversion data pulses. Afterwards a voltage level of the inversion signal is detected continuously whether it is a lowest level. After that, the lowest level is determined whether belonging to the inversion sync pulses when the voltage level of the inversion signal is the lowest level, and a detection signal is outputted. When the lowest level belongs to the inversion sync pulses, a voltage level of the detection signal is high, and the demodulation signal is an inversion SECAM-L demodulation signal.

19 Claims, 6 Drawing Sheets

SECAM-L DETECTOR AND VIDEO BROADCAST SYSTEM HAVING THE SAME

BACKGROUND OF THE INVENTION

1. Field of the Invention

The invention relates in general to video processing, and more particularly to a SECAM-L detector that controls a tuner to work correctly and a video broadcast system having the same.

2. Description of the Related Art

NTSC, PAL and SECAM are main video broadcast standards in use around the world. Since the spectrum arrangements of a SECAM-L signal are different from the others, e.g. NTSC-M or PAL-BG, if the SECAM-L signal are tuned in a non-SECAM-L mode, an inversion output results. Accordingly, it is much desired to have a SECAM-L detector that controls a tuner to work correctly and a video broadcast system having the same.

SUMMARY OF THE INVENTION

The invention is directed to a SECAM-L detector and a video broadcast system having the same. The SECAM-L detector is used to identify whether the demodulation signals demodulated by the tuner are correct so as to help the tuner set in a correct demodulation mode.

According to a first aspect of the present invention, a method for detecting SECAM-L signals is provided. The method comprises receiving a video signal and demodulating the video signal into a demodulation signal; filtering high-frequency (HF) components of the demodulation signal, the demodulation signal comprising a plurality of sync pluses and data pulses; inverting the demodulation signal into an inversion signal, the inversion signal comprising a plurality of inversion sync pulses and inversion data pulses in correspondence to the demodulation signal; continuously detecting whether a voltage level of the inversion signal is a lowest level; and when the voltage level of the inversion signal is the lowest level, determining whether the lowest level belongs to the inversion sync pulses and then sending out a detection signal, wherein when the lowest level belongs to the inversion sync pulses, a voltage level of the detection signal is a high level, the demodulation signal is an inversion SECAM-L demodulation signal.

According to a second aspect of the present invention, a method for detecting SECAM-L signals is provided. The method comprises demodulating a video signal into a demodulation signal; and detecting whether a voltage level of an inversion signal of the demodulation signal is a lowest level to determine whether the demodulation signal is an inversion SECAM-L demodulation signal.

According to a third aspect of the present invention, a video broadcast system is provided. The video broadcast system comprises a tuner and a SECAM-L detector. The tuner is for demodulating a video signal into a demodulation signal, which comprises a plurality of sync pulses and data pulses. The SECAM-L detector is for detecting whether a voltage level of an inversion signal of the demodulation signal is a lowest level to determine whether the demodulation signal is an inversion SECAM-L demodulation signal.

The invention will become apparent from the following detailed description of the preferred but non-limiting embodiments. The following description is made with reference to the accompanying drawings.

DETAILED DESCRIPTION OF THE INVENTION

The invention provides a video broadcast system, a SECAM-L detector and a method for detecting SECAM-L signals. The SECAM-L detector is used to identify whether the demodulation signals are correct so as to help the tuner set in a correct mode and display correct image frames on the display.

Figure 1A:
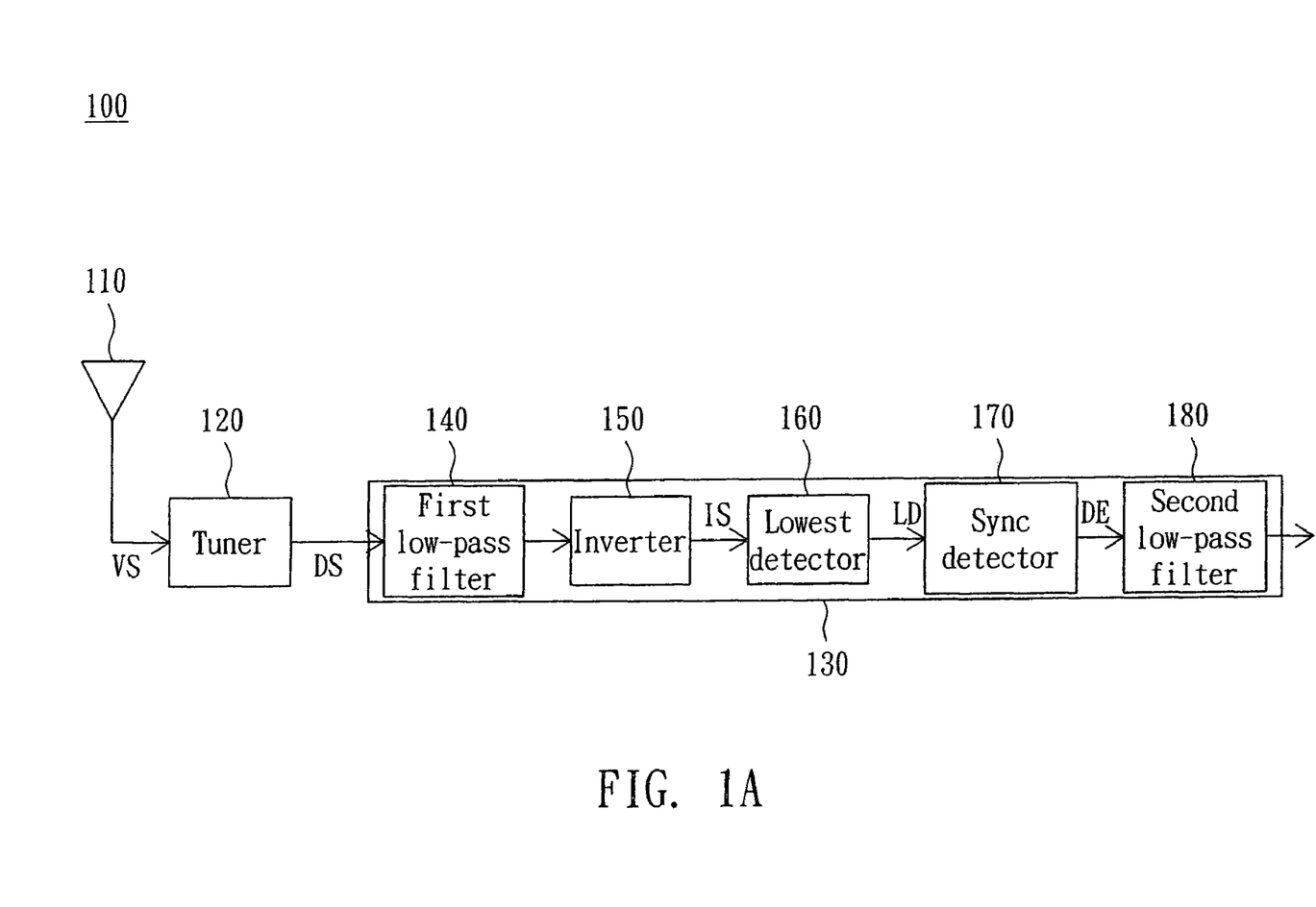
FIG. 1A is a schematic diagram of an example of a video system in accordance with a preferred embodiment of the invention.

Referring to FIG. 1A, a schematic diagram of an example of a video broadcast system in accordance with a preferred embodiment of the invention is shown. A video broadcast system 100 includes a tuner 120 and a SECAM-L detector 130. The tuner 120 receives a video signal VS from an antenna 110, and the video signal VS may be a NTSC signal, a PAL signal, a SECAM signal or a SECAM-L signal. The antenna 110 is embedded inside the video broadcast system 100, but is not limited thereto. The antenna 110 may be disposed outside of the video broadcast system 100. The tuner 120 demodulates the video signal VS into a demodulation signal DS, which is substantially a composite signal including multiple sync pulses and data pulses.

The SECAM-L detector 130 is for detecting whether a voltage level of an inversion signal of the demodulation signal DS is a lowest level to determine whether the demodulation signal DS is an inversion SECAM-L demodulation signal. The SECAM-L detector 130 includes a first low-pass filter 140, an inverter 150, a lowest detector 160, a sync detector 170 and a second low-pass filter 180. The first low-pass filter 140 receives the demodulation signal DS outputted by the tuner 120 and filters high frequency (HF) components of the demodulation signal DS, so that the demodulation signal DS remains only the characteristic components including the sync pulses and data pulses.

The inverter 150 is coupled to the first low-pass filter 140 and used to inverts the filtered demodulation signal DS into an inversion signal IS. The inversion signal IS includes a number of inversion sync pulses and inversion data pulses in correspondence to the demodulation signal DS. The lowest detector 160 receives the inversion signal IS and continuously detects whether a voltage level of the inversion signal IS is a lowest level LD. The lowest level LD is a voltage level of the inversion sync pulses. When the voltage level of the inversion signal IS is the lowest level LD, the sync detector 170 determines whether the lowest level LD belongs to the inversion sync pulses, that is, determines whether the inversion sync pulse is detected. Then, a detection signal DE is outputted from the sync detector 170, and the sync detector 170 changes a voltage level of the detection signal DE according to whether the inversion sync pulse is detected.

When the lowest level LD belongs to the inversion sync pulses, the detection signal DE sent out by the sync detector 170 has a high voltage level, and the video broadcast system 100 determines the video signal VS is a SECAM-L signal and the demodulation signal DS is the inversion SECAM-L demodulation signal. That is, the tuner 120 is incorrectly set in a non-SECAM-L mode for demodulating the received SECAM-L signal. Therefore, the SECAM-L detector 130 makes the video system 100 reset the tuner 120 to obtain the correct SECAM-L demodulation signal.

Besides, when the sync detector 170 determines the lowest level LD does not belong to the inversion sync pulses, the detection signal DE sent out by the sync detector 170 has a low voltage level. It represents that no matter what the kind of the video signal VS is, the tuner 120 has correctly demodulated the received video signal VS into the demodulation signal DS in a correct mode. The video broadcast system 100 will not reset the tuner 120 in this case. Moreover, in order to prevent from outputting an incorrect detection signal DE, the SECAM-L detector 130 further includes a second low-pass filter 180 for filtering the detection signal DE to reduce interference in the voltage level of the detection signal DE. The interference is generated due to error determination of the sync detector 170.

Figure 1B:
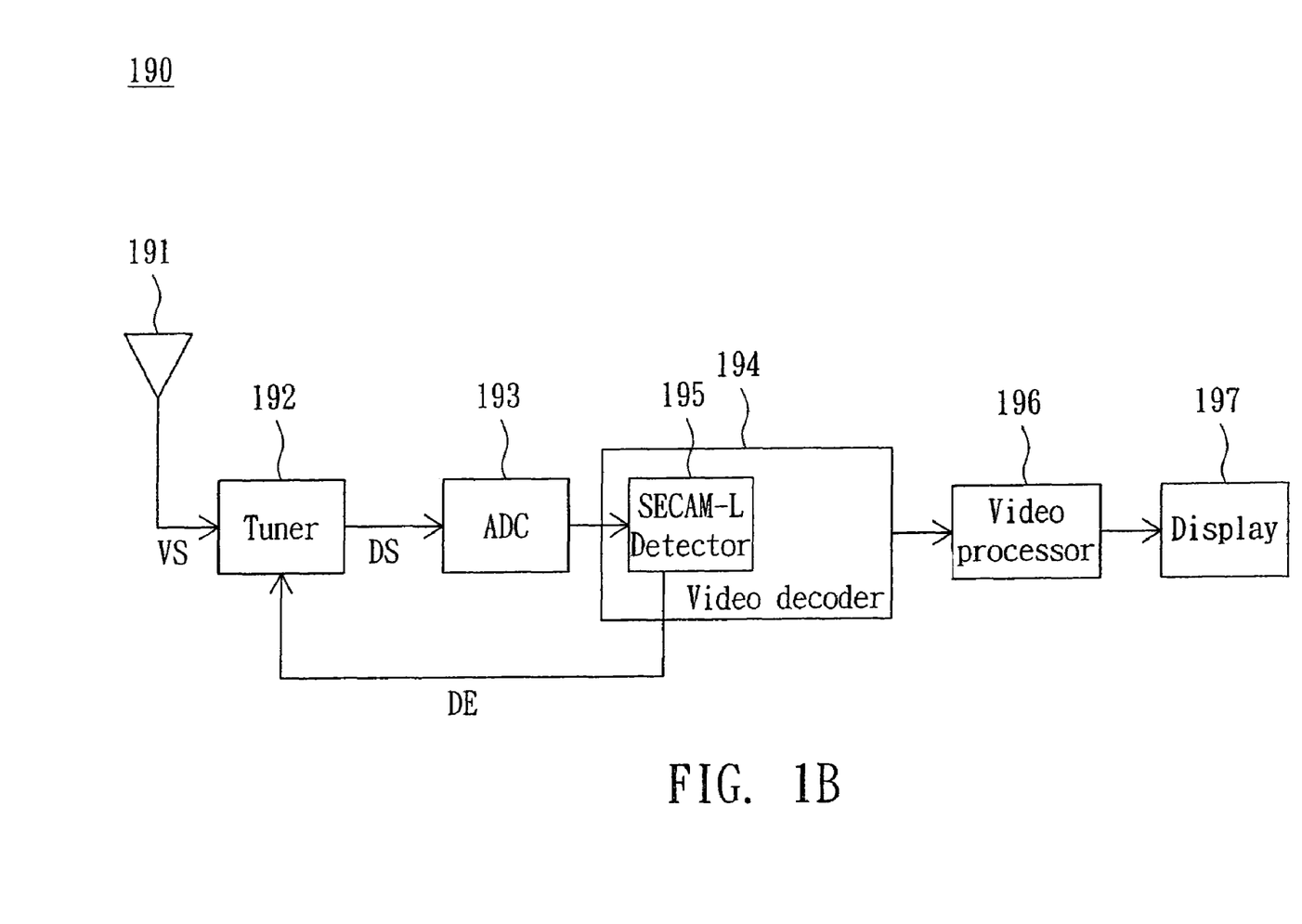
FIG. 1B is a schematic diagram of another example of a video system in accordance with a preferred embodiment of the invention.

Besides, the SECAM-L detector not only stands alone, but also may be embedded in a video decoder of the video broadcast system. Referring to FIG. 1B, a schematic diagram of another example of a video broadcast system in accordance with a preferred embodiment of the invention is shown. A video broadcast system 190 includes an antenna 191, a tuner 192, an analog to digital converter 193, a video decoder 194, a display 197 and a video processor 196. The antenna 191 receives a video signal VS, and the video signal VS may be a NTSC signal, a PAL signal, a SECAM signal or a SECAM-L signal.

The tuner 192 demodulates the video signal VS into a demodulation signal DS including a number of sync pulses and data pulses. The analog to digital converter 193 converts the demodulation signal DS to a digital demodulation signal. The video decoder 194 makes a decoding operation on the digital demodulation signal. The video decoder 194 includes a SECAML-L detector 195, which determines whether the digital demodulation signal is an inversion SECAM-L digital demodulation signal. The components and operation principles of the SECAM-L detector 195 are similar to the SECAM-L detector 130 in FIG. 1A and not repeated hereinafter. When the SECAM-L detector 195 detects that the digital demodulation signal is the inversion SECAM-L digital demodulation signal, the SECAM-L detector 195 feeds a detection signal DE with a high voltage level back to the tuner 192, such that the tuner 192 re-demodulates the video signal VS in a SECAM-L mode. The video processor 196 processes the decoded digital demodulation signal and accordingly displays a digital image frame on the display 197.

Figure 2:
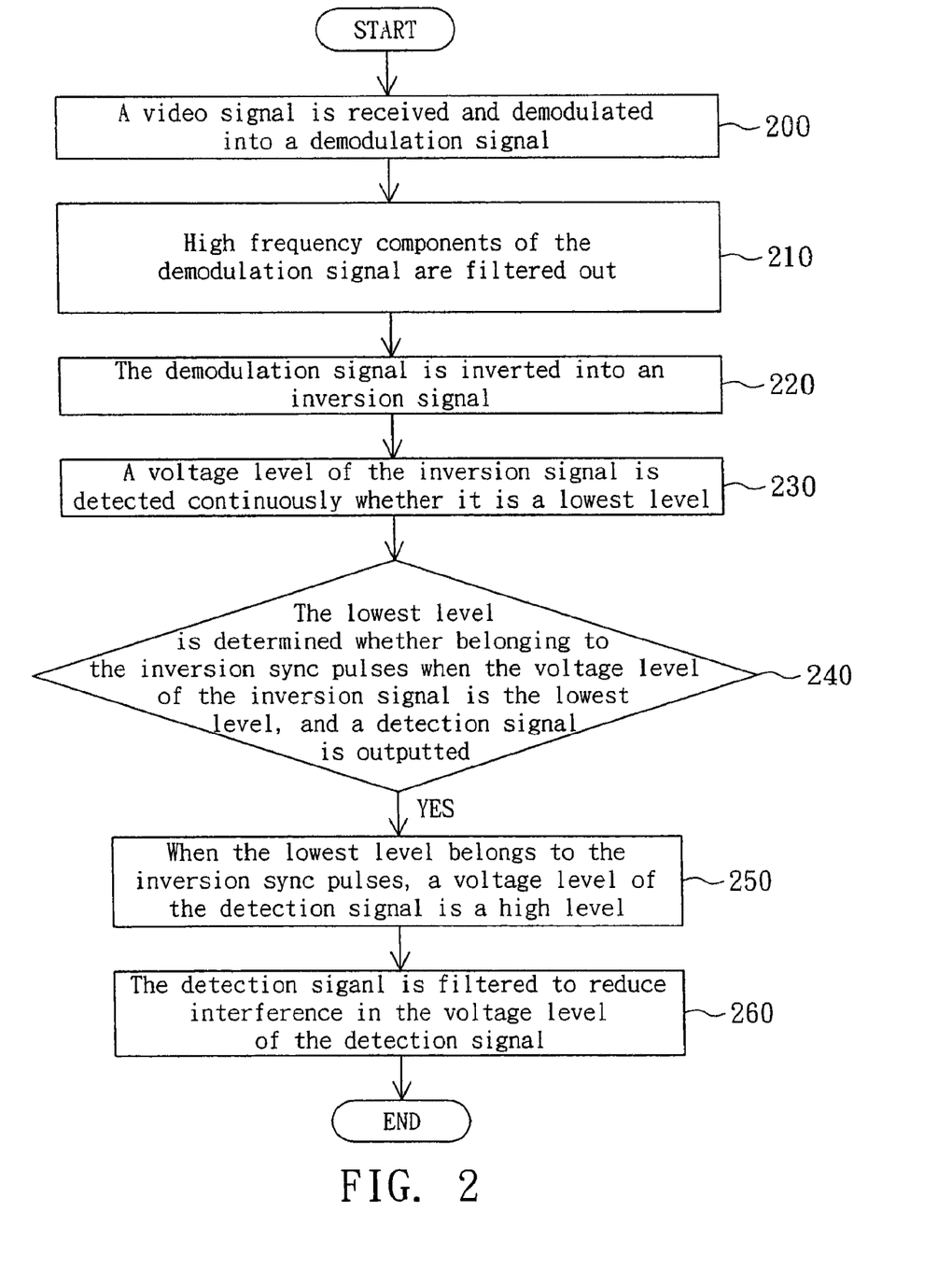
FIG. 2 is a flow chart of a method for detecting SECAM-L signals in accordance with a preferred embodiment of the invention.
Figure 3:
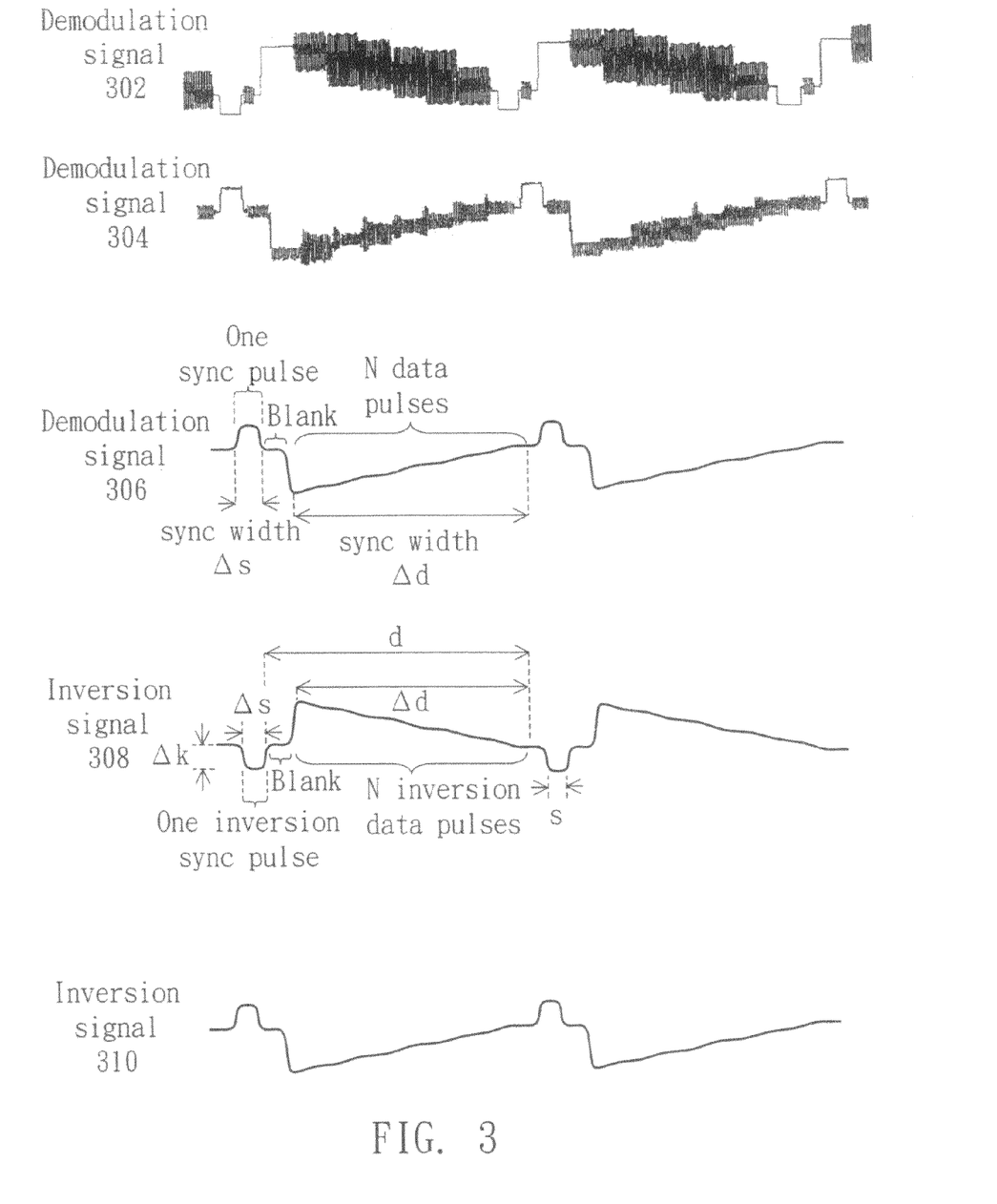
FIG. 3 is a waveform diagram of the signals used in the SECAM-L signal detection method in accordance with the preferred embodiment of the invention.

Referring to FIG. 2 and FIG. 3 at the same time, a flow chart of a method for detecting SECAM-L signals in accordance with a preferred embodiment of the invention and a waveform diagram of the signals used in the SECAM-L signal detection method in accordance with the preferred embodiment of the invention are shown respectively. First, in step 200, a video signal is received and demodulated into a demodulation signal. The video signal may be a NTSC signal, a PAL signal, a SECAM signal or a SECAM-L signal. The demodulation signal including a number of sync pulses and data pulses. If the video signal is the SECAM-L signal and is correctly demodulated in a SECAM-L mode, it will be the demodulation signal 302 as shown in FIG. 3. If the video signal is the SECAM-L signal, but is demodulated in a non-SECAM-L mode, it will be the demodulation signal 304 as shown in FIG. 3. The demodulation signals 302 and 304 are both composite signals.

In the following description, the video signal is exemplified to be the SECAM-L signal and be demodulated incorrectly, that is, it is demodulated into the demodulation signal 304 in a non-SECAM-L mode. In step 210, the HF components of the demodulation signal 304 are filtered out. Owing that the HF components of the demodulation signal 304 have been filtered out, the filtered demodulation signal 306 remains only the characteristic components of the demodulation signal 304, which includes a number of sync pulses sync and data pulses data. The sync pulses sync and the data pulses data subsequently are arranged by order of one sync pulse sync being followed by n data pulses data, wherein n is a positive integer. In a well-known SECAM-L specification, the pulse width of the sync pulse sync and a total pulse width of the n data pulses data have been explicitly defined. Here, the pulse width of the sync pulses sync is defined as a sync width $\Delta s$ and the total pulse width of the n data pulses data is defined as a data width $\Delta d$. There exits a blank between the sync pulse sync and the data pulses data.

In step 220, the demodulation signal 306 is inverted into an inversion signal 308. In correspondence to the sync pulses sync and data pulses data of the demodulation signal 306, the inversion signal 308 also includes a number of inversion sync pulses isync and inversion data pulses idata. The inversion sync pulse isync and n inversion data pulses idata are arranged by order of one inversion sync pulse isync followed by n inversion data pulses idata. The pulse width of the inversion sync pulse isync is also the sync width $\Delta s$ and the total pulse width of the n inversion data pulses is also the data width $\Delta d$. There also exists a blank between the inversion sync pulse isync and the inversion data pulses idata.

Figure 4:
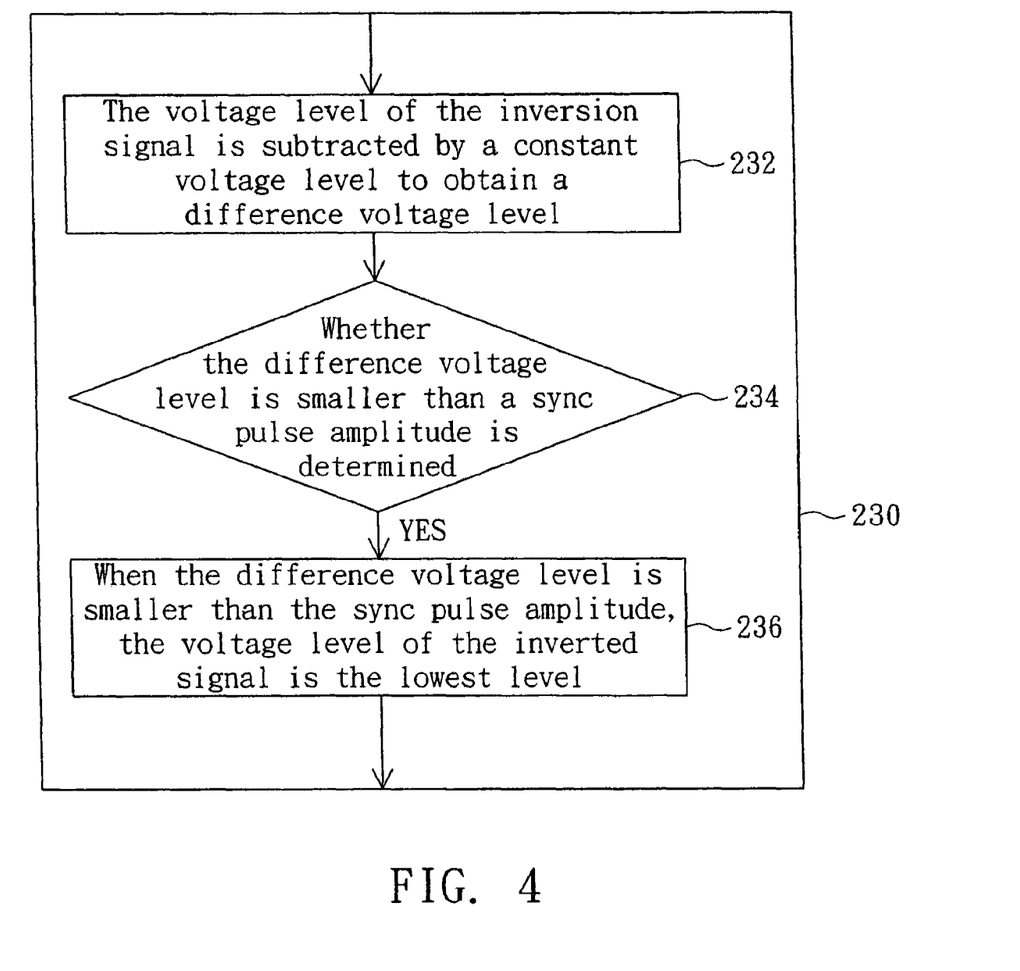
FIG. 4 is a detailed flow chart of the step 230 in the SECAM-L signal detection method in accordance with the preferred embodiment of the invention.

Following that, in step 230, whether a voltage level of the inversion signal 308 is a lowest level is continuously detected. The lowest level is the voltage level of the inversion sync pulse isync. Referring to FIG. 4, a detailed flow chart of the step 230 in the SECAM-L signal detection method in accordance with the preferred embodiment of the invention is shown. In step 232, the voltage level of the inversion signal 308 is subtracted by a constant voltage level to obtain a difference voltage level $\Delta v$, wherein the constant voltage level is substantially the voltage level of the inversion sync pulse isync of the inversion signal 308.

Afterward, in step 234, determine whether the difference voltage level $\Delta v$ is smaller than a sync pulse amplitude $\Delta h$, wherein the voltage level of the inversion sync pulse isync and the sync pulse amplitude $\Delta h$ have been defined explicitly in the well-known SECAM-L signal specification. Then, in step 236, when the difference voltage level $\Delta v$ is smaller than the sync pulse amplitude $\Delta h$, the voltage level of the inversion signal 308 is the lowest level. Inversely, if the difference voltage level $\Delta v$ is larger than the sync pulse amplitude, the voltage level of the inversion signal 308 is not the lowest level.

Figure 5:
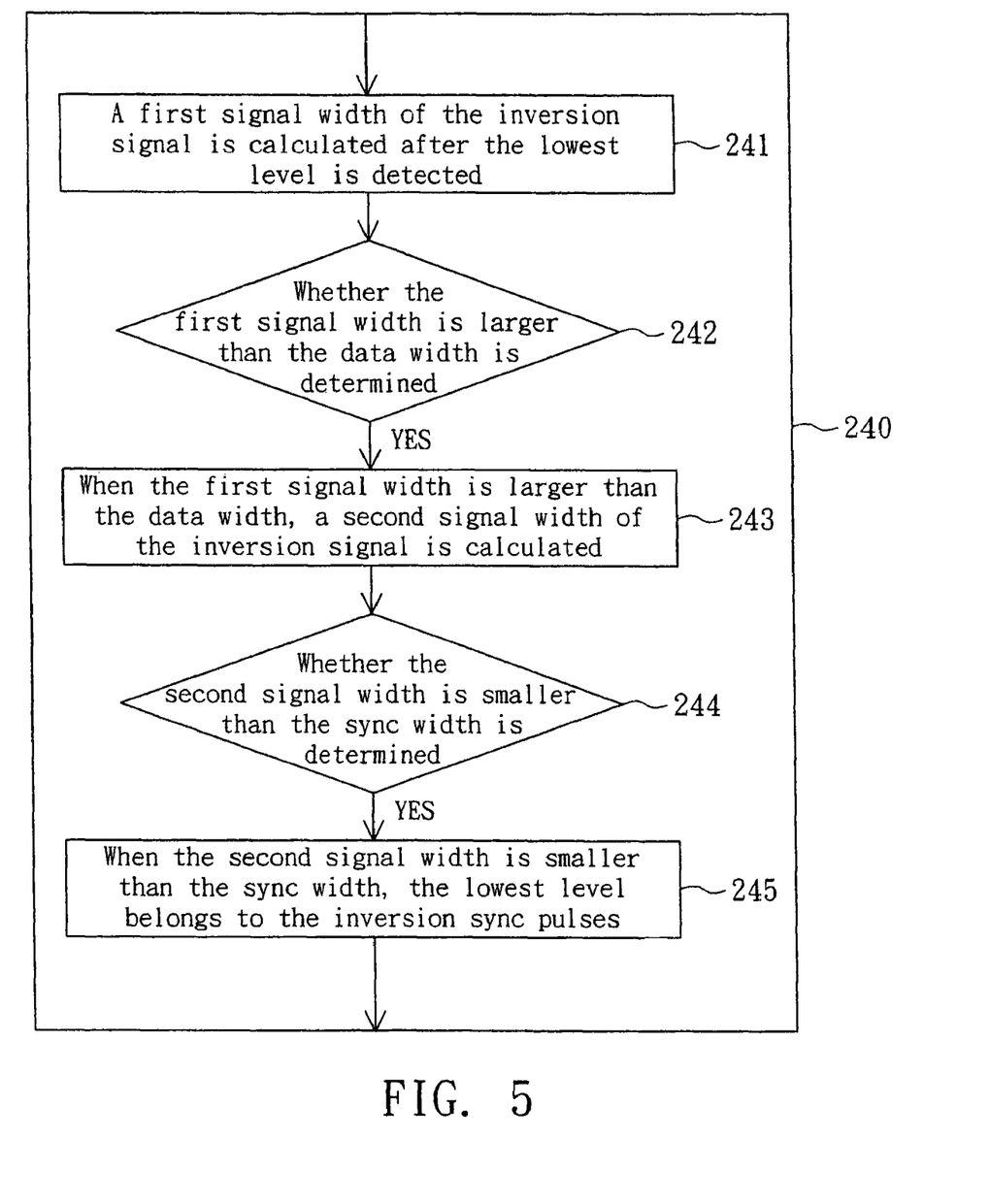
FIG. 5 is a detailed flow chart of the step 240 in the SECAM-L signal detection method in accordance with the preferred embodiment of the invention.

In step 240, when the voltage level of the inversion signal 308 is the lowest level, determine whether the lowest level belongs to the inversion sync pulses isync and then send out a detection signal. Referring to FIG. 5, a detailed flow chart of the step 240 in the SECAM-L signal detection method in accordance with the preferred embodiment of the invention is shown. In step 241, after detecting the lowest level, such as an X point, of the inversion signal 308, a first signal width d, which is not the lowest level, of the subsequent inversion signal is calculated. Then, whether the first signal width d is larger than the data width Δd is determined in step 242. If the first signal width d is smaller than the data width Δd, it represents that the detected lowest level does not belong to the inversion sync pulses isync and the inversion signal 308 is detected again.

Next, in step 243, when the first signal width d is larger than the data width Δd, a second signal width s, which is the lowest level, of the subsequent inversion signal is calculated. Then, in step 244, whether the second signal width s is smaller than the sync width Δs is determined. If the second signal width s is larger than the sync width Δs, it represents that the detected lowest level does not belong to the inversion sync pulses isync and the inversion signal 308 is detected again. In step 245, when the second signal width s is smaller than the sync width Δs, the lowest level belongs to the inversion sync pulses isync. In the detailed steps 241~245 of the step 240, the signal width can be calculated by a timer in a practical circuit operation.

In step 250, when the lowest level belongs to the inversion sync pulses isync, the voltage level of the detection signal sent out is a high level, that is, in step 200, the video signal (SECAM-L signal) is demodulated into the demodulation signal 304 in a non-SECAM-L mode and the video signal (SECAM-L signal) is incorrectly demodulated into an inversion SECAM-L demodulation signal. Therefore, the demodulation mode can be reset to obtain a correct demodulation signal in a SECAM-L mode.

In step 200, if the video signal (SECAM-L signal) is correctly demodulated, it is demodulated into the demodulation signal 302 as shown in FIG. 3. The inversion signal obtained through the steps 210 and 220 is the inversion signal 310 of FIG. 3. If the inversion signal 310 has the lowest level in the step 230, its lowest level normally belongs to the inversion data pulses idata. After the determination of the step 240, it can be clearly known that the lowest level does not belong to the inversion sync pulses isync. Therefore, the voltage level of the detection signal sent out is a low level. It represents in the step 200, the video signal (SECAM-L signal) is correctly demodulated into the demodulation signal 302 in the SECAM-L mode.

However, if the lowest-levels of the some inversion data pulses idata are incorrectly determined to belong to the inversion sync pulses isync, the detection signal sent out has a high voltage level in some occasion. Therefore, in the method for detecting SECAM-L signals disclosed in the embodiment further includes a step 260. In the step 260, filter the detection signal to reduce interference in the voltage level of the detection signal. By doing so, even there occurs occasional error determination, it will not affect the detection of SECAM-L signals. As a result, the SECAM-L signal can be correctly demodulated into a SECAM-L demodulation signal in a SECAM-L mode to provide correct image frames on a display.

The video broadcast system, SECAM-L detector and method thereof disclosed by the above embodiment of the invention detect whether there exists an inversion sync signal based on the well-defined specification of SECAM-L signals and accordingly identify whether the demodulation signal demodulated by the tuner is a SECAM-L demodulation signal or an inversion SECAM-L demodulation signal so as to help the tuner automatically set in a correct demodulation mode.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for detecting SECAM-L signals, comprising:
   utilizing a tuner to receive a video signal and demodulate the video signal into a demodulation signal comprising high-frequency (HF) components, a plurality of sync pulses and data pulses;
   utilizing a SECAM-L detector to filter the high-frequency (HF) components of the demodulation signal;
   utilizing the SECAM-L detector to invert the filtered demodulation signal into an inversion signal, the inversion signal comprising a plurality of inversion sync pulses and inversion data pulses in correspondence to the demodulation signal;
   utilizing the SECAM-L detector to continuously detect whether the inversion signal is at a lowest level; and
   when the inversion signal is at the lowest level, utilizing the SECAM-L detector to determine whether the inversion signal at the lowest level belongs to the inversion sync pulses and then send out a detection signal;
   wherein when the inversion signal at the lowest level belongs to the inversion sync pulses, the detection signal is at a high level, and the demodulation signal is an inversion SECAM-L demodulation signal.

2. The method according to claim 1, further comprising:
   utilizing the SECAM-L detector to filter the detection signal to reduce interference in the voltage level of the detection signal.

3. The method according to claim 1, wherein the lowest level is a voltage level of the inversion sync pluses.

4. The method according to claim 3, wherein the step of utilizing the SECAM-L detector to continuously detect whether the inversion signal is at a lowest level further comprises:
   utilizing the SECAM-L detector to subtract a voltage level of the inversion signal by a constant voltage level to obtain a difference voltage level; and
   utilizing the SECAM-L detector to determine whether the difference voltage level is smaller than a sync pulse amplitude;
   wherein when the difference voltage level is smaller than the sync pulse amplitude, the inversion signal is at the lowest level, and when the difference voltage level is larger than the sync pulse amplitude, the inversion signal is not at the lowest level.

5. The method according to claim 4, wherein the constant voltage level is the voltage level of the inversion sync pulses.

6. The method according to claim 1, wherein the sync pulses and the data pulses are arranged by order of one sync pulse being followed by n data pulses, n is a positive integer, a pulse width of the sync pulse and a total pulse width of the n data pulses are constant, the pulse width of the sync pulse is defined as a sync width and total pulse width of the n data pulses is defined as a data width.

7. The method according to claim 6, wherein the inversion sync pulse and the inversion data pulses are arranged by order of one inversion sync pulse being followed by n inversion data pulses, a pulse width of the inversion sync pulse is the sync width, and a total pulse width of the n inversion data pulses is the data width.

8. The method according to claim 7, wherein the step of utilizing the SECAM-L detector to determine whether the inversion signal at the lowest level belongs to the inversion sync pulses further comprises:

utilizing the SECAM-L detector to calculate a first signal width of the subsequent inversion signal different from the lowest level after detecting the lowest level and determining whether the first signal width is larger than the data width; and when the first signal width is larger than the data width, utilizing the SECAM-L detector to calculate a second signal width of the inversion signal equal to the lowest level and coming immediately after the first signal width, and to determine whether the second signal width is smaller than the sync width;

wherein, when the second signal width is smaller than the sync width, the inversion signal at the lowest level belongs to the inversion sync pulses.

9. A method for detecting SECAM-L signals, comprising:
utilizing a tuner to demodulate a video signal into a demodulation signal; and
utilizing a SECAM-L detector to detect whether an inversion signal of the demodulation signal is at a lowest level to determine whether the demodulation signal is an inversion SECAM-L demodulation signal.

10. The method according to claim 9, wherein the demodulation signal comprises a plurality of sync pulses and data pulses, the inversion signal comprises a plurality of inversion sync pulses and inversion data pulses in correspondence to the demodulation signal, the lowest level is a voltage level of the inversion sync pluses, further comprising the step of when the inversion signal is at the lowest level, determining by the SECAM-L detector whether the inversion signal at the lowest level belongs to the inversion sync pulses, wherein when the inversion signal at the lowest level belongs to the inversion sync pulses, the demodulation signal is the inversion SECAM-L demodulation signal.

11. The method according to claim 10, wherein the step of detecting whether the inversion signal is at a lowest level, further comprising:
utilizing the SECAM-L detector to subtract the voltage level of the inversion signal by a constant voltage level to obtain a difference voltage level; and
utilizing the SECAM-L detector to determine whether the difference voltage level is smaller than a sync pulse amplitude;
wherein when the difference voltage level is smaller than the sync pulse amplitude, the inversion signal is at the lowest level and when the difference voltage level is larger than the sync pulse amplitude, the inversion signal is not at the lowest level.

12. A video broadcast system, comprising:
a tuner, for demodulating a video signal into a demodulation signal comprising high-frequency (HF) components, a plurality of sync pulses and data pulses; and
a SECAM-L detector, for detecting whether an inversion signal of the demodulation signal is at a lowest level to determine whether the demodulation signal is an inversion SECAM-L demodulation signal.

13. The video broadcast system according to claim 12, wherein the SECAM-L detector comprises:
a first low-pass filter, for receiving the demodulation signal and filtering the HF components of the demodulation signal;
an inverter, coupled to the first low-pass filter, for inverting the filtered demodulation signal into the inversion signal, the inversion signal comprising a plurality of inversion sync pulses and inversion data pulses in correspondence to the demodulation signal;
a lowest detector, for continuously detecting whether the inversion signal is at the lowest level; and
a sync detector, wherein when the inversion signal is at the lowest level, the sync detector determines whether the inversion signal at the lowest level belongs to the inversion sync pulses and sends out a detection signal;
wherein when the inversion signal at the lowest level belongs to the inversion sync pulses, the detection signal is at a high level and the demodulation signal is the inversion SECAM-L demodulation signal.

14. The video broadcast system according to claim 13, wherein the lowest level is a voltage level of the inversion sync pulses.

15. The video broadcast system according to claim 13, wherein the sync pulses and the data pulses are arranged by order of one sync pulse being followed by n data pulses, the inversion sync pulse and the inversion data pulses are arranged by order of one inversion sync pulse being followed by n inversion data pulses, and n is a positive integer.

16. The video broadcast system according to claim 13, wherein the SECAM-L detector further comprises:
a second low-pass filter, for filtering the detection signal to reduce interference in the voltage level of the detection signal.

17. The video broadcast system according to claim 13, wherein when the detection signal is at a high level, the video signal is a SECAM-L signal and the tuner demodulates the SECAM-L signal into the inversion SECAM-L demodulation signal in a non-SECAM-L mode.

18. The video broadcast system according to claim 13, wherein when the inversion signal at the lowest level does not belong to the inversion sync pulses, the detection signal is at a low level, the tuner demodulates the video signal into the demodulation signal in a correct mode.

19. The video broadcast system according to claim 13, wherein the video signal is a NTSC signal, a PAL signal, a SECAM signal or a SECAM-L signal.

* * * * *